United States Patent
Griffith, Jr. et al.

(10) Patent No.: US 6,489,024 B2
(45) Date of Patent: Dec. 3, 2002

US006489024B2

(54) PRESSURE SENSITIVE ADHESIVE TAPE CONTAINING NATURAL RUBBER LATEX

(75) Inventors: William Bryan Griffith, Jr., North Wales, PA (US); Andrew Graham Bunn, Bryn Mawr, PA (US); Isabelle Ercolei Uhl, Grasse (FR); Kim Sang Ho, Richboro, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/780,341

(22) Filed: Feb. 12, 2001

(65) Prior Publication Data

US 2002/0142154 A1 Oct. 3, 2002

(51) Int. Cl.$^7$ ................................................ B32B 7/12
(52) U.S. Cl. ...................... 428/356; 428/343; 428/353; 428/355 R; 428/355 RA
(58) Field of Search ................................ 428/343, 346, 428/353, 354, 355 R, 356, 355 RA, 355 BL

(56) References Cited

U.S. PATENT DOCUMENTS

| | | | |
|---|---|---|---|
| 3,380,938 A | | 4/1968 | Jack et al. |
| 3,628,987 A | * | 12/1971 | Nakata et al. ............ 427/208.4 |
| 4,208,311 A | | 6/1980 | Kinoshita et la. ........... 260/29.2 |
| 4,491,646 A | * | 1/1985 | Gruber et al. ............. 428/425.1 |
| 4,644,026 A | | 2/1987 | Shuman et al. .............. 524/270 |
| 5,389,438 A | * | 2/1995 | Miller et al. ........... 428/355 BL |
| 5,427,851 A | * | 6/1995 | Mehta ..................... 428/355 R |
| 5,547,766 A | | 8/1996 | Gobran ........................ 428/515 |
| 5,663,213 A | * | 9/1997 | Jones et al. .................. 424/419 |
| 5,663,218 A | | 9/1997 | Jones et al. .................. 523/105 |
| 5,672,402 A | * | 9/1997 | Kreckel et al. ............. 428/34.2 |
| 5,728,759 A | | 3/1998 | Pike ............................ 524/270 |
| 5,891,580 A | | 4/1999 | Fricke et al. ............. 428/424.8 |
| 6,017,998 A | | 1/2000 | Duan et al. .................. 524/591 |
| 6,218,588 B1 | * | 4/2001 | Dommisse et al. ... 428/355 BL |
| 6,281,298 B1 | * | 8/2001 | Papsin, Jr. .................. 524/272 |
| 6,294,250 B1 | * | 9/2001 | Date ........................ 427/207.1 |

FOREIGN PATENT DOCUMENTS

| | | |
|---|---|---|
| DE | 3842344 A1 | 6/1990 |
| EP | 0622432 A1 | 11/1994 |
| EP | 0669124 A1 | 8/1995 |
| EP | 0688843 A1 | 12/1995 |
| EP | 0761201 A1 | 3/1997 |
| EP | 0960923 A1 | 12/1999 |
| JP | 11 172212 | 6/1999 |
| WO | WO 84/04533 | 11/1984 |
| WO | WO 00/15727 | 3/2000 |

OTHER PUBLICATIONS

Hercules, Tackified Waterbone Adhesives, New formulating opportunities for PSA Tapes, pages total 4, J.G. de Hullu, Application & Development Lab, Harcules BV, Middleburg, The Netherlands.

Natural Lates—David R. St. Cyr (Sales & Marketing Mgr.) The Ore & Chemical Corporation 2809 S. Lynnhaven Road Virginia Beach, VA 23452.

Natural Rubber Adhesives—G.L. Butler—Handbook of Pressure Sensitive Adhesive Technology (p. 261–295).

Adhesives Manufacturing Technology—Compounding Natural Latex in–by Richard C. Oldack and Robert E. Bloss, Firestone Natural Rubber & Latex Company, Akron, Ohio Water–Based PSA's (pp. 38–44).

* cited by examiner

Primary Examiner—James J. Seidleck
Assistant Examiner—Travis B. Ribar
(74) Attorney, Agent, or Firm—Kenneth Crimaldi; Carl P. Hemenway

(57) ABSTRACT

An adhesive tape comprising: (a) a polymer film; (b) a primer coat on said polymer film; and (c) an adhesive layer on the primer coat comprising: (i) a natural rubber latex; and (ii) a tackifier.

14 Claims, No Drawings

PRESSURE SENSITIVE ADHESIVE TAPE CONTAINING NATURAL RUBBER LATEX

CROSS REFERENCE TO RELATED PATENT APPLICATIONS

This is a non-provisional application of prior pending U.S. provisional application Titled "PRESSURE SENSITIVE ADHESIVE TAPE CONTAINING NATURAL RUBBER LATEX", filed Jan. 15, 2001.

BACKGROUND

This invention relates generally to an adhesive tape comprising a tackified natural rubber latex and a primer.

The use of natural rubber in pressure sensitive adhesives is well known. Such adhesives employ solvent-borne natural rubber, in which rubber obtained by centrifuging natural rubber latex is masticated and applied to a backing material from a solvent solution. The mastication process decreases the molecular weight of the rubber, which is believed to result in improved adhesion, possibly at the expense of cohesive strength.

There has been no significant commercial production of adhesive coatings made from water-borne rubber to date, despite the fact that environmental and health factors would favor the use of water-borne rubber. Anchorage of the adhesive to the filmic backing is a critical problem in natural rubber latex adhesive tapes. When rolls of the tape are unwound, delamination and adhesive transfer to the back side of the film remaining on the roll frequently occur. A related concern is that the tapes generate considerable noise on commercial lines when they are unwound for slitting into small rolls of adhesive tape.

Adhesive tapes from waterborne natural rubber latex have been known since the 1940's, when methods were developed to incorporate water-insoluble solid tackifiers into aqueous dispersions. The problem of anchorage was addressed by incorporating addition polymer emulsions. Unfortunately, addition polymers are detrimental to the adhesive properties of the tape and thus are not commercially useful.

Japanese patent application, JP 11-172212 (1999), suggests that an adhesive comprising natural rubber latex, synthetic rubber latex, and an ethylene-vinyl acetate-acrylate copolymer emulsion provides good anchorage. All examples without the EVA copolymer have poor anchorage and high unwind noise due to stepped delamination. However, this reference acknowledges that use of the EVA copolymer has a detrimental effect on the adhesive properties, a deficiency which is partially overcome by the use of the synthetic rubber.

The problem addressed by this invention is to find a pressure sensitive tape adhesive containing natural rubber latex and having a good balance of adhesive properties, as well as anchorage. An additional benefit for a pressure sensitive tape would be low noise upon unwinding.

STATEMENT OF INVENTION

The present invention is directed to an adhesive tape comprising: (a) a polymer film; (b) a primer coat on said polymer film; and (c) an adhesive layer on the primer coat, the adhesive layer comprising: (i) a natural rubber latex; and (ii) a tackifier.

DETAILED DESCRIPTION

The term "adhesive tape" includes, for example, packaging tape, printable tape, specialty tape and protective film.

The term "polymer film" refers to any polymer in the form of a film suitable for manufacture of an adhesive tape. The preferred polymer films are those made from polyolefins, including but not limited to polypropylene, polyethylene and copolymers and combinations thereof; polyester; and polyvinyl chloride (PVC). The most preferred polymer film is oriented polypropylene film (OPP). Preferably, the polymer film has undergone corona or flame treatment to improve anchorage prior to being coated with primer and adhesive.

The term "acrylic polymers" refers to polymers of acrylic acid, methacrylic acid and their esters, and copolymers predominantly comprising the aforementioned monomers.

The term "tackifier" refers to a resin or combination of resins which imparts tack to an adhesive formulation, especially in the context of a tape adhesive. Preferred tackifiers include rosin tackifiers, polyterpene resins, aliphatic hydrocarbon resins, aromatic petroleum resins, phenol resins, styrene resins and coumarone-indene resins. A "rosin tackifier" is a tackifier derived from a rosin, including but not limited to rosins, rosin esters, rosin derivatives, hydrogenated rosins, hydrogenated rosin esters and hydrogenated rosin derivatives. The rosin tackifier is included as the solid resin or as a liquid dispersion or emulsion. The preferred rosin tackifier is a rosin ester tackifier.

The term "primer" refers to a solvent-based or aqueous material applied to a polymer film backing to form a primer coat, thereby increasing anchorage of a tape adhesive to the film. Preferably, the primer is a solvent-based or aqueous polymer composition in which the polymeric component has a $T_g$ no greater than $-10°$ C. Most preferably, the primer is an aqueous polymer composition in which the polymeric component has a $T_g$ no greater than $-10°$ C., and which contains a crosslinking agent. Preferred primers include solvent-based or aqueous acrylic polymers, ethylene-vinyl acetate copolymers, ethylene-vinyl acetate-acrylic copolymers, styrene-butadiene copolymers, and styrene-butadiene-acrylonitrile copolymers. In a preferred embodiment of the invention, the polymeric component of the primer comprises from 0.2% to 20% of monomer units bearing a functional group suitable for crosslinking, e.g., carboxylic acid, hydroxyl, and amine; more preferably from 1% to 5%. Still more preferably, the polymeric component is an acrylic polymer having a $T_g$ no greater than $-10°$ C. and comprising from 1% to 5% of acrylic acid or methacrylic acid monomer units, most preferably from 1.5% to 2.5%.

Preferably, at least one crosslinking agent is added to the primer, preferably before coating the primer on the polymer film. A crosslinking agent is a material effective for crosslinking, e.g., via hydroxyl or carboxylic acid functional groups in an aqueous medium or in a solvent. Preferably, one of the crosslinking agents well known in the art is used with a primer whose polymeric component bears the appropriate functional groups. These crosslinking agents include, but are not limited to, difunctional or polyfunctional isocyanates, blocked isocyanates, carbodiimides, diamines, triamines, polyamines, aziridines, amine functional resins, e.g., melamines and urea-formaldehyde resins, epoxy resins, epoxides, acids, anhydrides and polymers with conjugated unsaturation. Preferred crosslinking agents are those which are effective for crosslinking via both hydroxyl and carboxylic acid functional groups, especially difunctional or polyfunctional isocyanates and carbodiimides. Preferably, the crosslinking agent is added to the primer at a level from 1% to 20% by total weight of primer, most preferably from 2% to 10% by total weight of primer.

The primer typically is coated onto the film to form a primer coat with a dry coat weight from 0.5 to 6 $g/m^2$, preferably from 2 to 3 g/m². The adhesive layer is applied to the primer coat. Preferably the primer coat is dried prior to application of the adhesive. layer. In a preferred embodiment of the invention, the primer coat has been crosslinked by a crosslinking agent present in the primer.

Preferably, the adhesive layer contains less than 25% of a synthetic rubber. Most preferably, the adhesive layer is substantially free of synthetic rubber, e.g., polyisoprene or styrene-butadiene rubber, or other synthetic polymers.

In one embodiment of the invention, the adhesive contains from 1% to 10% of latex particles each of which has a void and a particle size from 50 to 500 nm, as described in U.S. Pat. No. 5,663,213. Such particles act as uv absorbers in the adhesive. Preferably, the adhesive contains from 3% to 6% of said latex particles.

The adhesive tape optionally contains other additives typically used in adhesive tapes, e.g., antioxidants, uv stabilizers, mechanical stabilizers, surfactants, defoamers, pigments, humectants and plasticizers.

The present invention is directed also to an adhesive tape produced by: (a) applying a primer to a polymer film to form a primer coat; and (b) applying to the primer coat an adhesive comprising: (i) a natural rubber latex; and (ii) a tackifier. Preferably, the natural rubber latex and the tackifier are mixed to form an adhesive, which is then applied to the primer coat. Preferably, the primer coat is dried prior to application of the adhesive.

EXAMPLE

Tape samples were prepared with a variety of primers and tackifiers. For the samples prepared with primer, the weight of the dry primer coat was approximately 2.5 g/m² and the coat weight of the adhesive was approximately 13 g/m². For the samples prepared without primer, the coat weight of the adhesive was approximately 17 g/m². All coat weights were determined after drying. Samples are designated 1A–1E, 2A–2E, 3A–3E, and 4A–4E. Tackifiers used in the samples were as follows: "A" samples contained TACOLYN 1070, a hydrocarbon (α-methylstyrene) tackifier available from Hercules Co. (Wilmington, DE); the "B" samples contained SNOWTACK 780G, a rosin ester tackifier available from Akzo Nobel (Maastricht, Netherlands); the "C" samples contained SNOWTACK 790G, a rosin ester tackifier available from Akzo Nobel (Maastricht, Netherlands); the "D" samples contained SNOWTACK 880G, a mixed hydrocarbon/rosin ester tackifier available from Akzo Nobel (Maastricht, Netherlands); and the "E" samples contained DERMULSENE TR 501, a terpene phenolic resin tackifier available from ND Dispersions (Dax, France).

The samples were subjected to tests of anchorage and adhesion as follows. Anchorage upon unwind was assessed by unwinding a rolled tape sample and observing the extent of transfer of the adhesive to the back of the tape, from "none" to "complete." The "finger rub" assessment was done by rubbing the adhesive layer manually and evaluating the degree to which the adhesive was removed on a scale from 0–10. Adhesive face-to-face anchorage was evaluated by repeatedly contacting the adhesive side of the tape with another section of adhesive side at room temperature, then separating the adhesive sides and evaluating anchorage of the adhesive on a scale from 0–10. For the "finger rub" and face-to-face anchorage evaluations, a score of 0 indicates that the adhesive was readily transferred, scores of 5–7 indicate some anchorage, and a score of 10 indicates little or no transfer of adhesive even under stress. Adhesive peel was measured on stainless steel according to ASTM #D 3330/D 3330M-00 (Method A), but with a dwell time of ten minutes. The results are reported in N/10 mm. The "A" following the numerical result indicates that the failure was adhesive. A description of the samples and the test results are presented in the Table.

TABLE

| Sample | Primer | Anchorage unwind (amount of transfer) | finger rub | adhesive face-to-face | Peel |
|---|---|---|---|---|---|
| 1A | none | none | 0 | 0 | 2.1 A |
| 1B | none | complete | 0 | 0 | 2.1 A |
| 1C | none | complete | 0 | 0 | 2.3 A |
| 1D | none | complete | 0 | 0 | 2.2 A |
| 1E | none | partial | 0 | 0 | 2.5 A |
| 2A[1] | rubber/MMA[2] | — | — | — | — |
| 2B | rubber/MMA[2] | none | 0 | 0 | 1.2 A |
| 2C | rubber/MMA[2] | none | 0 | 0 | 1.6 A |
| 2D | rubber/MMA[2] | none | 0 | 0 | 1.5 A |
| 2E | rubber/MMA[2] | none | 0 | 0 | 2.0 A |
| 3A | acrylic[3] | none | 5 | 5 | 1.8 A |
| 3B | acrylic[3] | none | 6 | 6 | 1.3 A |
| 3C | acrylic[3] | none | 6 | 6 | 1.8 A |
| 3D | acrylic[3] | none | 7 | 7 | 1.5 A |
| 3E | acrylic[3] | mostly | 6 | 7 | 1.8 A |
| 4A | acrylic/NCO[4] | none | 10 | 10 | 1.5 A |
| 4B | acrylic/NCO[4] | none | 10 | 10 | 1.5 A |
| 4C | acrylic/NCO[4] | none | 10 | 10 | 1.8 A |
| 4D | acrylic/NCO[4] | none | 10 | 10 | 1.7 A |
| 4E | acrylic/NCO[4] | almost complete | 9 | 7 | 1.5 A |

[1]The adhesive could not be coated over the primer.
[2]HEVEATUF 1320 latex polymer consisting of 80% natural rubber and 20% MMA graft (available from Heveatex Corp., Fall River, MA).
[3]PRIMAL PR 9599 aqueous acrylic primer (available from Rohm and Haas Company, Philadelphia, PA).
[4]Acrylic primer used in previous samples, with 5% (wet on wet) BASONAT PLR 8878 aliphatic diisocyanate (available from BASF, Ludwigshafen, Germany).

What is claimed is:

1. An adhesive tape comprising:
   (a) a polymer film;
   (b) a crosslinked primer coat on said polymer film; and
   (c) an adhesive layer on said primer coat, said adhesive layer comprising
   (i) a natural rubber latex; and (ii) a tackifier,
   wherein said primer coat is a crosslinked polymer selected from the group consisting of crosslinked acrylic polymers, crosslinked ethylene-vinyl acetate copolymers, crosslinked ethylene-vinyl acetate-acrylic copolymers, crosslinked styrene-butadiene copolymers, crosslinked styrene-butadiene-acrylonitrile copolymers, copolymers thereof, and mixtures thereof.

2. The adhesive tape of claim 1 wherein said tackifier is selected from the group consisting of rosin tackifiers, polyterpene resins, aliphatic hydrocarbon resins, coumarone-indene resins, and mixtures thereof.

3. The adhesive tape of claim 1 wherein said adhesive layer comprises
   (a) 0 to 25% by weight synthetic rubber, based on the weight of said adhesive layer; and
   (b) 75 to 100% by weight natural rubber latex, based on the weight of said adhesive layer.

4. The adhesive tape of claim 1 wherein said polymer film is selected from the group consisting of polyolefin films, polyester films, and PVC films; and wherein said polymer film has undergone corona or flame treatment.

5. The adhesive tape of claim 1 wherein said primer coat has a $T_g$ no greater than −10° C.

6. The adhesive tape of claim 1, further comprising from 1% to 10% of latex particles each of which has a void and a particle size of from 50 to 500 nm.

7. An adhesive tape prepared by a process comprising the steps of:
   (a) applying a primer to a polymer film to form a primer coat;
   (b) applying to said primer coat an aqueous adhesive comprising natural rubber latex and a tackifier; and
   (c) drying or allowing to dry said aqueous mixture.

8. The adhesive tape of claim 7, wherein said aqueous adhesive comprises:
   (a) 0 to 25% by weight synthetic rubber, based on the weight of said adhesive layer; and
   (b) 75 to 100% by weight natural rubber latex, based on the weight of said adhesive layer.

9. The adhesive tape of claim 7, wherein said tape further comprises from 1% to 10% of latex particles, each of which has a void and a particle size from 50 to 500 nm.

10. The adhesive tape of claim 7, wherein said primer comprises an aqueous carrier and a polymeric component.

11. The adhesive of claim 10, wherein said polymeric component has a $T_g$ of no greater than −10° C.

12. The adhesive tape of claim 10, wherein said polymeric component is selected from the group consisting of acrylic polymers, ethylene-vinyl acetate copolymers, ethylene-vinyl acetate-acrylic copolymers, styrene-butadiene copolymers, styrene-butadiene-acrylonitrile copolymers, copolymers thereof, and mixtures thereof.

13. The adhesive tape of claim 10, wherein said primer further comprises a crosslinking agent at a level from 1% to 20% by total weight of primer.

14. The adhesive tape of claim 13, wherein said crosslinking agent is selected from the group consisting of difunctional amines, polyfunctional amines, aziridines, difunctional isocyanates, polyfunctional isocyanates, and mixtures thereof.

* * * * *